(12) United States Patent
Murali et al.

(10) Patent No.: US 11,032,769 B2
(45) Date of Patent: Jun. 8, 2021

(54) HIERARCHICAL WAKEUP APPARATUS AND METHOD

(71) Applicant: Silicon Laboratories Inc., Austin, TX (US)

(72) Inventors: Partha Sarathy Murali, Sunnyvale, CA (US); Nagaraja Reddy Anakala, Hyderabad (IN); Ajay Mantha, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/845,813

(22) Filed: Dec. 18, 2017

(65) Prior Publication Data

US 2019/0191372 A1    Jun. 20, 2019

(51) Int. Cl.

| | |
|---|---|
| *H04W 52/02* | (2009.01) |
| *H04W 4/80* | (2018.01) |
| *H04W 4/029* | (2018.01) |
| *H04W 4/06* | (2009.01) |
| *H04W 4/70* | (2018.01) |
| *H04W 84/18* | (2009.01) |
| *H04W 84/12* | (2009.01) |
| *H04L 25/02* | (2006.01) |
| *H04L 27/06* | (2006.01) |

(52) U.S. Cl.
CPC ......... *H04W 52/0229* (2013.01); *H04L 25/02* (2013.01); *H04L 27/06* (2013.01); *H04W 4/80* (2018.02); *H04W 52/0216* (2013.01); *H04W 4/029* (2018.02); *H04W 4/06* (2013.01); *H04W 4/70* (2018.02); *H04W 84/12* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 6,493,824 | B1 * | 12/2002 | Novoa | H04L 63/0428 |
| | | | | 713/162 |
| 9,477,292 | B1 * | 10/2016 | Murali | G06F 1/3243 |
| 10,321,402 | B2 * | 6/2019 | Park | H04L 27/04 |
| 2009/0291656 | A1 * | 11/2009 | Le Reverend | H04W 52/0229 |
| | | | | 455/227 |
| 2013/0208831 | A1 * | 8/2013 | Oehler | H04W 52/02 |
| | | | | 375/316 |
| 2014/0050133 | A1 * | 2/2014 | Jafarian | H04W 74/085 |
| | | | | 370/311 |

(Continued)

*Primary Examiner* — Ajit Patel
*Assistant Examiner* — Liem H. Nguyen
(74) *Attorney, Agent, or Firm* — FIle-EE-Patents.com; Jay A. Chesavage

(57) ABSTRACT

A mesh receiver has a wakeup receiver for reception of a wakeup sequence formed by keyed RF or a sequence of wireless packets and gaps, a transmitter forming low speed RF wakeup sequence to other mesh stations, a mesh receiver for reception of high speed WLAN packets, the transmitter sending a wireless ACK packet in response to a wakeup sequence, the mesh receiver thereafter receiving wireless packets from a remote station, the mesh transmitter sending an ACK, the mesh station thereafter identifying a next hop station, and sending a wakeup sequence to that station, after receipt of an ACK, sending the data, the mesh receiver and mesh transmitter thereafter going to sleep.

20 Claims, 13 Drawing Sheets

(56) References Cited

U.S. PATENT DOCUMENTS

| | | | | |
|---|---|---|---|---|
| 2014/0126442 A1* | 5/2014 | Jafarian | ............ | H04W 52/0212 |
| | | | | 370/311 |
| 2014/0211678 A1* | 7/2014 | Jafarian | ............ | H04W 52/0216 |
| | | | | 370/311 |
| 2016/0373237 A1* | 12/2016 | Shellhammer | ........ | H04L 7/0012 |
| 2017/0264406 A1* | 9/2017 | Lei | ....................... | H04J 11/0069 |
| 2018/0192373 A1* | 7/2018 | Fang | ................. | H04W 52/0235 |
| 2018/0279224 A1* | 9/2018 | Yang | .................. | H04W 52/028 |
| 2018/0302901 A1* | 10/2018 | Suh | ................... | H04W 52/0235 |
| 2019/0082390 A1* | 3/2019 | Azizi | ................ | H04W 52/0229 |

\* cited by examiner

Building with gateway AP and Stations S1–S8

| | GW1 | | | |
|---|---|---|---|---|
| | Stn | SOC | RSSI | GW hops |
| L1 | M1 | 80% | −30dbm | GP0 |
| | | | | |
| | | | | |
| | | | | |

| | M1 | | | |
|---|---|---|---|---|
| | Stn | SOC | RSSI | GW hops |
| L1 | GW1 | 90% | −30dbm | GP1 |
| L4 | M2 | 80% | −30dbm | GP3 |
| L2 | M4 | 80% | −30dbm | GP3 |

| | M2 | | | |
|---|---|---|---|---|
| L4 | M1 | 80% | −30dbm | GP2 |
| L3 | M4 | 85% | −30dbm | — |
| L5 | M5 | 80% | −30dbm | — |
| L6 | M3 | 80% | −30dbm | — |

| | M3 | | | |
|---|---|---|---|---|
| L6 | M2 | 80% | −30dbm | GP3 |
| L7 | M5 | 80% | −30dbm | GP4 |
| | | | | |
| | | | | |

| | M4 | | | |
|---|---|---|---|---|
| L2 | M1 | 75% | −30dbm | GP2 |
| L3 | M2 | 80% | −30dbm | GP3 |
| L11 | M5 | 80% | −30dbm | GP4 |
| L10 | M7 | 80% | −30dbm | GP5 |
| L8 | M6 | 75% | −30dbm | GP6 |

| | M5 | | | |
|---|---|---|---|---|
| L7 | M3 | 80% | −30dbm | GP4 |
| L5 | M2 | 85% | −30dbm | GP3 |
| L11 | M4 | 75% | −30dbm | GP3 |
| L12 | M7 | 80% | −30dbm | GP4 |
| L13 | M8 | 85% | −30dbm | GP5 |

M6

| Stn | SOC | RSSI | GW hops |
|-----|-----|------|---------|
| L8  | M4  | 85%  | −30dbm | GP3 |
| L9  | M7  | 80%  | −30dbm | GP4 |
|     |     |      |        |     |

M7

| Stn | SOC | RSSI | GW hops |
|-----|-----|------|---------|
| L9  | M6  | 80%  | −30dbm | GP4 |
| L10 | M4  | 85%  | −30dbm | GP3 |
| L12 | M5  | 80%  | −30dbm | GP4 |
| L14 | M8  | 80%  | −30dbm | GP5 |

M8

| L14 | M7 | 75% | −30dbm | GP4 |
| L13 | M5 | 80% | −30dbm | GP4 |
|     |    |     |        |     |
|     |    |     |        |     |

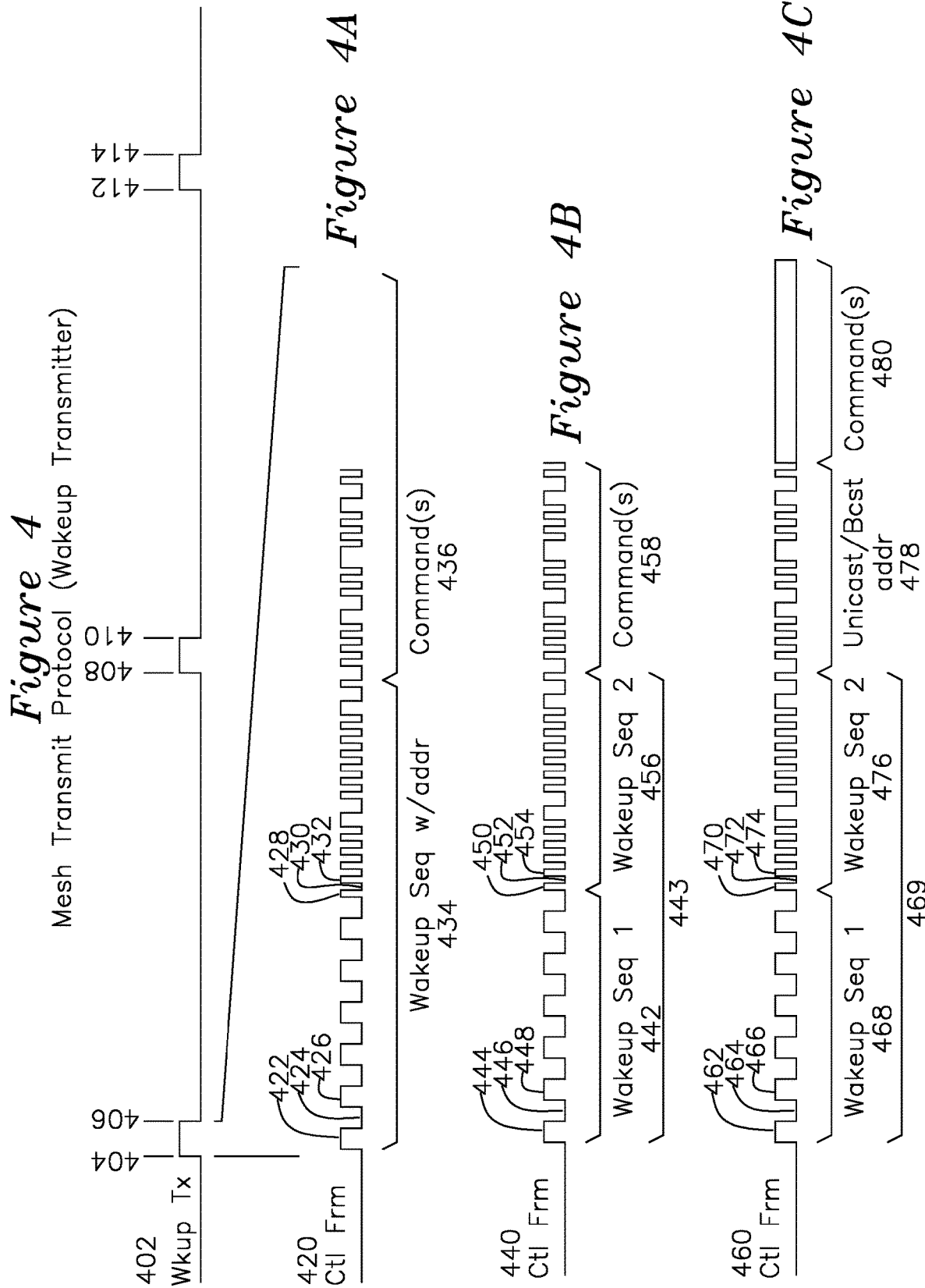

Inter-Stn Comm

Mesh Communications

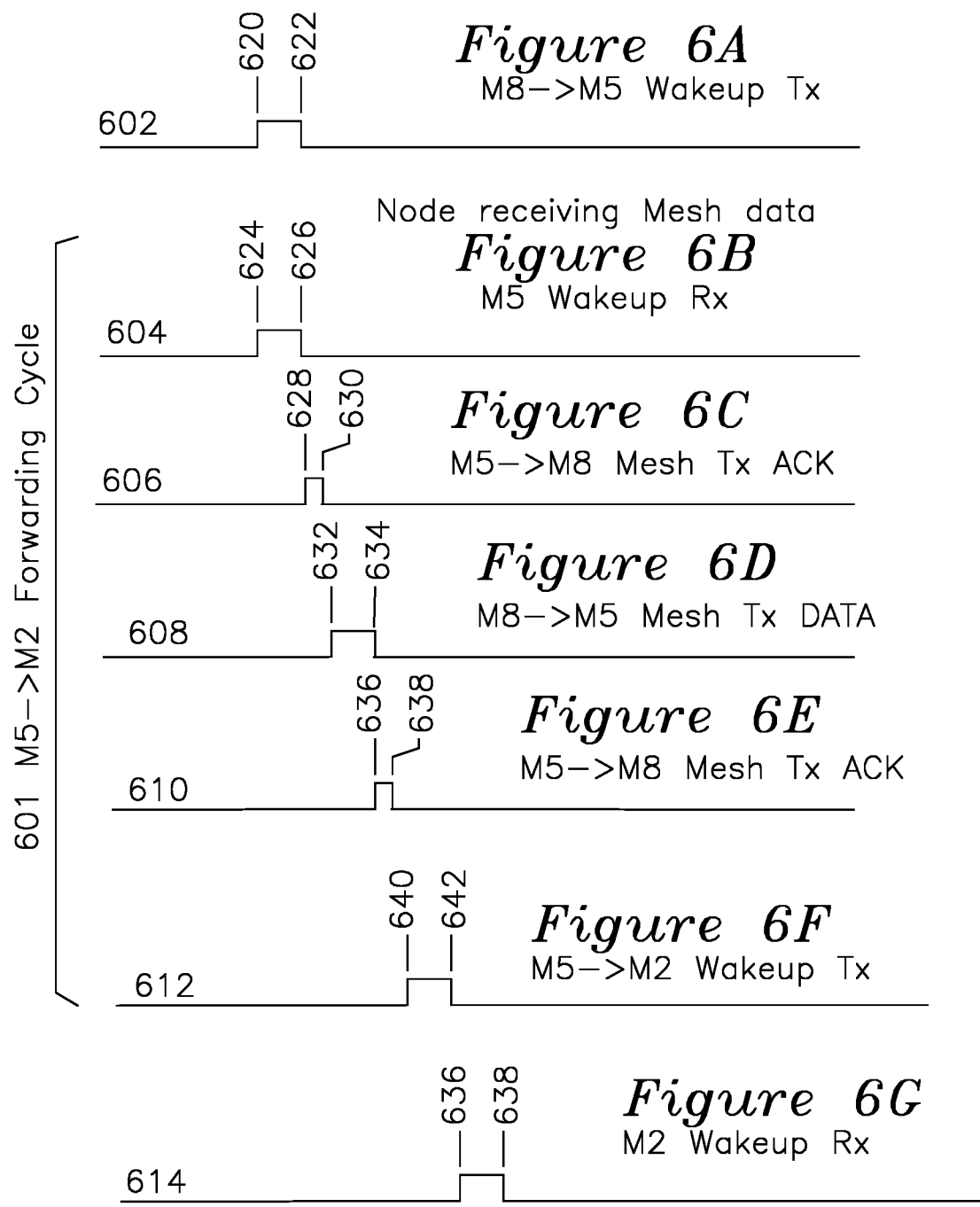

Wakeup Receiver

Transmitter (Wakeup/Mesh)

Mesh Receiver Process

Package Delivery/Tracking

Consumer Tag Tracking

Smart City

Sparse Mesh Network

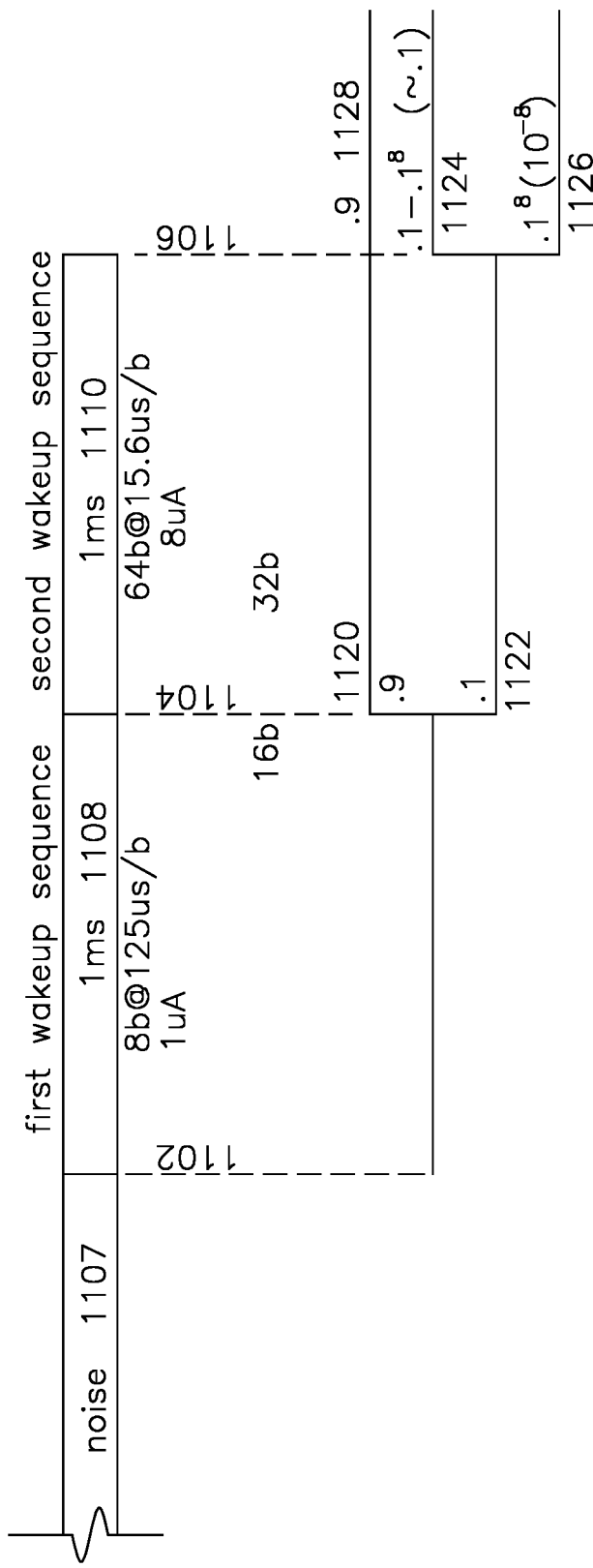

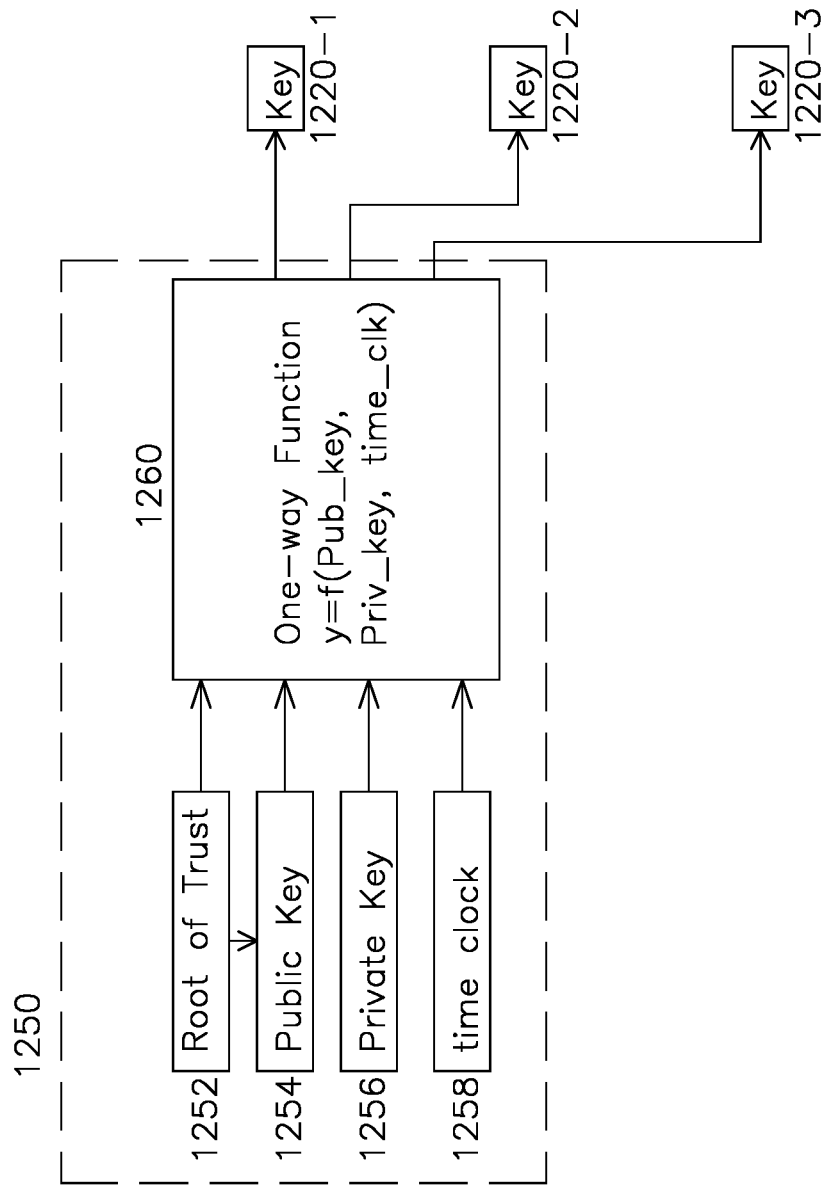

HIERARCHICAL WAKEUP APPARATUS AND METHOD

FIELD OF THE INVENTION

The present invention relates to stations and methods for providing low power connectivity in a mesh network. In particular, the invention provides a low power wakeup apparatus and mechanism for stations positioned in receiving range of each other.

BACKGROUND OF THE INVENTION

Prior art wireless systems such as 802.11 provide communications where a central node (an "access point") is coupled to other stations using an "infrastructure mode". This type of infrastructure system relies on the access point being powered continuously, and the power savings comes about by using, for example, access point beacon frames, where the access point periodically transmits beacon frames at expected times, such that the stations wake up at corresponding intervals of time and listen to beacon TDIM frames which indicate whether packets are available at that time of coming out of a sleep mode. The power consumption is thereby reduced by a factor equal to the small percentage of time the stations are awake compared to the beacon interval. This type of infrastructure works well where the access point is able to be powered by an external power source, and requires that the stations be clustered within receiving range of the access point. FIG. 1A shows an example positioning of stations S1 through S8 and access point AP1. Typical attenuation of wireless signals is as follows (2x indicates a doubling of separation distance between stations):

| | |
|---|---|
| Line of Sight(LOS) loss | 6 dB/2x distance |
| Indoor LOS loss with multi-path | 12 dB/2x distance |
| loss per concrete floor traversal | 15 dB/floor + indoor LOS loss |

Accordingly, if the network of FIG. 1A were in open space without barriers and examined in plan view (positioned horizontally in open space), the loss from AP1 to S1 might be 61 dB, AP1 to S2 67 dB, and AP1 to S4 71 dB, whereas for the same dimensions, with FIG. 1A examined as an elevation view with the lines representing concrete floors and including indoor multipath loss, the loss from AP1 to S1 would be 106 dB, from AP1 to S2 would be 157 dB, and from AP1 to S3 would be in excess of 200 dB. If the link budget is on the order of 140 dB, then most of the stations are out of range of the access point.

Another type of network is known as a mesh network, where the stations each communicate with each other as peers. For FIG. 1A, this type of network topology has S1 communicate with AP1 and S2, S2 to S1, S4, S5, and S3, etc. The mesh network has a different set of considerations and issues. One issue is that the network needs to find a route from each station to a gateway such as AP1, and another issue is that there is no centralized timing or transmission as infrastructure mode provides.

Both types of networks, infrastructure and mesh, require access to the internet at large, which is provided by a function known as a gateway router. This functionality is typically offered through an access point AP1 of FIG. 1A, or it may alternatively be offered through a mesh station having connectivity to a gateway router.

Battery powered systems utilize a finite amount of Joule stored energy, such that the Joule product of power*time may be conserved only by either reducing power or reducing the amount of time that power is drawn. When viewed from the perspective of a fixed Joule source and a desired battery lifetime for a given battery size, the problem reduces to one of duty cycle and latency. In the following illustrations of prior art, a fixed source of two AAA batteries is used, which provides 1000 mAh @ 3V. Accordingly, for 10 year operation form this storage source, the average current draw is maximum 10 uA at 3V, which will now be used to compare the performance of various prior art systems.

In the prior art, battery powered network nodes typically use Bluetooth (at a typical 6 mA listen current at 3V) which offers lower power consumption than 802.11 WLAN (at a typical 60 mA listen current at 3V). For a 10 year battery life using two AAA batteries, and the best case of synchronous wakeup intervals across all stations, an average current of 10 uA could be accomplished in Bluetooth (from 5 mA continuous current) by power-cycling the Bluetooth device on for periodic and synchronized listen intervals across all stations, with a duty cycle of 1/500 and a 1 ms on (listen) time. The corresponding approach could be used in WiFi with a duty cycle of 1/6000 and a 1 ms on (listen) time, both would satisfy the 10 uA average current requirement specified. The 10 year 1 AH 3V constraint using two AA cells is used as a uniform baseline example for understanding the invention and its benefits, other power source capacities can be computed using those metrics in the same manner.

For a mesh of 4 stations, where one station has to check with each of the four other stations, each check requiring a 1 ms event wakeup event, the time for each hop is 1 ms*500*4=2 s for Bluetooth and 1 ms*6000*4=24 s for WiFi. Accordingly, just 10 hops through a mesh network has a latency of 20 s (~4 min) for Bluetooth and 4 minutes for WiFi, which are unacceptable for most purposes.

With four edge nodes (reducing throughput by 4), and where WiFi data throughput is 10 Mbps peak (at 1/6000 duty cycle) and Bluetooth throughput is 250 Kbps (at 1/500 duty cycle), the above examples provide per-day download data of 18 MB for WiFi and 5.4 MB for Bluetooth, which would restrict these uses to very low data transfer applications.

Another problem of the prior art is that for dynamically changing networks, a significant amount of power is consumed with RF advertising, in the case of Bluetooth (Bluetooth Low Energy, known as BLE), where the slave device has an advertising interval and the master device has a scan window and scan interval. As the below table shows, short Bluetooth connection times require the advertising window and scan interval both be short, which greatly increases battery drain. For Bluetooth Long Range (BLR), the problem is exacerbated over BLE by the increased BLR transmit frames and requirement for low duty cycle.

| Advertising interval (ms) | Scan Window (ms) | Scan Interval (ms) | Avg connection time (s) | 99% connection time (s) |
|---|---|---|---|---|
| 30 | 30 | 30 | .02 | 0.04 |
| 60 | 30 | 30 | .03 | 0.07 |
| 100 | 30 | 30 | .06 | 0.11 |
| 30 | 11.25 | 1280 | 2.71 | 12.8 |
| 60 | 11.25 | 1280 | 5.54 | 23.04 |
| 100 | 11.25 | 1280 | 8.92 | 35.84 |
| 1280 | 30 | 30 | 0.67 | 1.37 |
| 1280 | 11.25 | 1280 | 162.5 | 323.84 |

Another problem of mesh networks is that the wakeup mechanism may consume large amounts of power attending to wakeup sequences which are not intended for the station receiving them, causing unnecessary battery drain.

It is desired to provide an apparatus and method for ultra-low power mesh networks which provides a hierarchical wakeup mechanism and post-wakeup bidirectional connectivity from a plurality of peer stations to a gateway router at a higher data rate than the prior art provides.

OBJECTS OF THE INVENTION

A first object of the invention is a hierarchical wakeup receiver apparatus and method for a mesh device, the hierarchical wakeup apparatus and method utilizing the reception of a first comparatively low speed wakeup sequence which utilizes a sequence of packets or on/off keying at a comparatively low rate, upon matching the first sequence, the wakeup receiver is operative to receive a comparatively high rate second wakeup sequence of packets or on/off keying to indicate whether a receiving station is to wakeup.

A second object of the invention is a transmitter apparatus and method for sending wakeup sequences, the transmitter using entire packets or keyed RF to form 1 and 0 values in a first sequence and a second sequence, the first sequence having a lower rate of 1 and 0 transmission than subsequent sequences of 1 s and 0 s.

A third object of the invention is a mesh device and method for receiving packets, the mesh device having a wakeup receiver and a mesh receiver, the wakeup receiver receiving wakeup frames optionally comprising a first wakeup segment and a second wakeup segment followed by an optional command part, the wakeup receiver comparing the wakeup segments against respective patterns, and when the wakeup segments match the respective patterns, optionally examining the command part, the mesh receiver thereafter waking up and accepting WLAN packets, the mesh receiver thereafter receiving packets and placing them into a queue, thereafter the mesh receiver sending a wakeup sequence directed to a remote node of the mesh based on a routing destination, the node transmitting the packets from the receive queue, thereafter going back into a sleep mode upon acknowledgement of receipt by the remote node.

A fourth object of the invention is a mesh device and method for transmitting packets, the mesh device having a transmitter in a wakeup transmit mode which transmits an entire packet to form each 1 value and not transmitting for an equal interval of time to form a 0 value during a wakeup transmit interval to send a sequence of 1 and 0 values forming a wakeup sequence, after a remote mesh station has awaken in response to the wakeup sequence and replied with an acknowledgement, thereafter the transmitter operative in a mesh transmit mode to send WLAN packets and going back to sleep when completed.

A fifth object of the invention is an apparatus and method for ultra-low power communications operative on a mesh device having a wakeup transmitter, the wakeup transmitter periodically transmitting a wakeup sequence of 1 s and 0 s, where each 1 is formed from the transmission of an entire WLAN packet, and each 0 is formed by non-transmission during an interval corresponding to the duration of a WLAN packet, the remote station acknowledging the wakeup sequence by sending an acknowledgement packet.

A sixth object of the invention is an apparatus and method for sending a wakeup sequence to a remote station using a WLAN transmitter, the WLAN transmitter sending a first sequence of 1 s and 0 s, each 1 formed from an entire WLAN packet or RF keying and each 0 formed by an interval of non-transmission having a duration equal to the duration of a WLAN packet, the WLAN thereafter sending a second sequence of 1 s and 0 s, each 1 formed from an entire WLAN packet or RF keying which is shorter than a WLAN packet or RF keying of the first sequence and each 0 formed by an interval of non-transmission equal to the duration of a second sequence WLAN packet.

A seventh object of the invention is an apparatus and method for ultra-low power communications operative on a mesh device having a wakeup receiver, the wakeup receiver operative continuously and operative to detect a first pattern of 1 s and 0 s formed from entire WLAN packets followed by a second pattern of 1 s and 0 s formed from entire WLAN packets of shorter duration than the WLAN packets of the first pattern, the wake-up receiver operative to listen to the first sequence and second sequence, if the first sequence and second sequence match respective template patterns, the wakeup receiver next receiving a unicast or broadcast address and an optional command containing a channel assignment or protocol assignment for a receiving mesh node.

SUMMARY OF THE INVENTION

A mesh network node known as "Wake-Fi™" has a transmitter operative in a wakeup mode and a mesh transmit mode. In a wakeup transmit mode, the node periodically transmits a wakeup sequence to surrounding mesh network nodes with is either node specific (unicast) or universal (broadcast), the wakeup sequence operative to enable at least one surrounding mesh network node. The wakeup sequence may also include an optional command, such as a mesh protocol assignment, which may direct subsequent communications to be using one of the 802.11 WLAN protocols, Bluetooth Low Energy protocol, Bluetooth Long Range protocol, Zigbee protocol, or contain a channel hopping assignment, frequency assignment or channel assignment for use in subsequent communications. The node transmits the wakeup pattern as a sequence of a series of 1 and 0 values using a low power RF transmitter to form the wakeup sequence, each 1 formed from an entire wireless packet of fixed length, with a single packet representing a 1 value, and the absence of transmission representing a 0 value and of equal duration as the packet of the 1 value. The RF generated for the wakeup sequence need not be precision frequency or formed from a packet, but simply RF that can be mixed, rectified and detected, such as RF from a ring oscillator or other simple low power method. The wakeup sequence optionally has a first unique sequence which is transmitted at a low data rate, and a second sequence which is transmitted at a comparatively faster data rate. Alternatively, the wakeup sequence may be a unique sequence, matching the wakeup pattern for at least one surrounding node. Following the acknowledgement of the wakeup pattern with a wireless packet, the transmitter may thereafter send WLAN packets for propagation through the mesh network.

Each mesh network node also has an ultra-low power receiver which is operative to receive the wakeup sequence formed from entire packets transmitted by a different mesh node. Upon receipt of the wakeup sequence and any optional commands which follow, the node wakes up and transmits an acknowledgement as a WLAN packet in a mesh transmit mode. Upon receiving the matching wakeup pattern, mesh network node powers up a fully-featured receiver and receives and buffers any packets which follow, acknowledging reception and powering down until a subsequent transmit event for sending the packets through the mesh network.

In an advertising mode, each mesh network node sends out a short periodic advertisement, which all surrounding stations receive and use to update their connectivity table to indicate the respective power level of the received advertisement.

In a communications mode, when the mesh network node has data to transmit or forward, the mesh node determines which mesh node is along the best path, and best receiver, and optionally selects a mesh station to equalize power consumption or resource utilization using a table of nearby stations which indicate for each nearby station a signal strength, hop count to a gateway if applicable, battery state of charge (to ensure uniform draw on all of the devices in the mesh) and causes the wakeup transmitter to send a wakeup frame containing the address or wakeup pattern of the next station. When the mesh network node receives an acknowledgement to the wakeup sequence from the remote station (which was sent using a high speed protocol such as WLAN, Bluetooth, Zigbee), the mesh network node transmits one or more high speed protocol (WLAN, Bluetooth, Zigbee) frames to the destination station.

Either periodically with the transmission of advertising sequence patterns (received by all stations), or alternatively when the mesh node wakeup receiver receives a wakeup sequence from an adjacent station, the wakeup receiver checks to see that the transmitting station is in a current list of stations, and either adds the adjacent station to the list of stations or updates an existing entry for that adjacent station, with the list of stations organized by a remote station identifier. Optionally, the transmitting station includes a metric indicating its distance from a gateway, its state of charge (SOC), and any other information which is used in the node's own advertisements to other nodes for its distance to the gateway and SOC information for computing route metrics, for the case of the gateway distance, by adding one to the number of hops to the gateway.

BRIEF DESCRIPTION OF THE DRAWINGS

FIG. 4 shows waveforms for the sequence of transmissions by a wake-up transmitter of a node of FIG. 3.

FIGS. 4A, 4B, and 4C show waveforms for alternate wakeup transmit sequences.

FIGS. 6A, 6B, 6C, 6D, 6E, 6F, and 6G show timing diagrams for the movement of data through three stations.

FIG. 10A-1 shows a plan view of an example residence of FIG. 10A.

FIG. 11A shows a timing diagram for an example hierarchical first and second wakeup sequence.

FIG. 11B shows a table of false alarm rates for the first and second wakeup sequence of FIG. 11A.

FIG. 12A shows a block diagram of a secure wakeup pattern generator for use in a transmitter and receiver.

DETAILED DESCRIPTION OF THE INVENTION

Figure 1A:
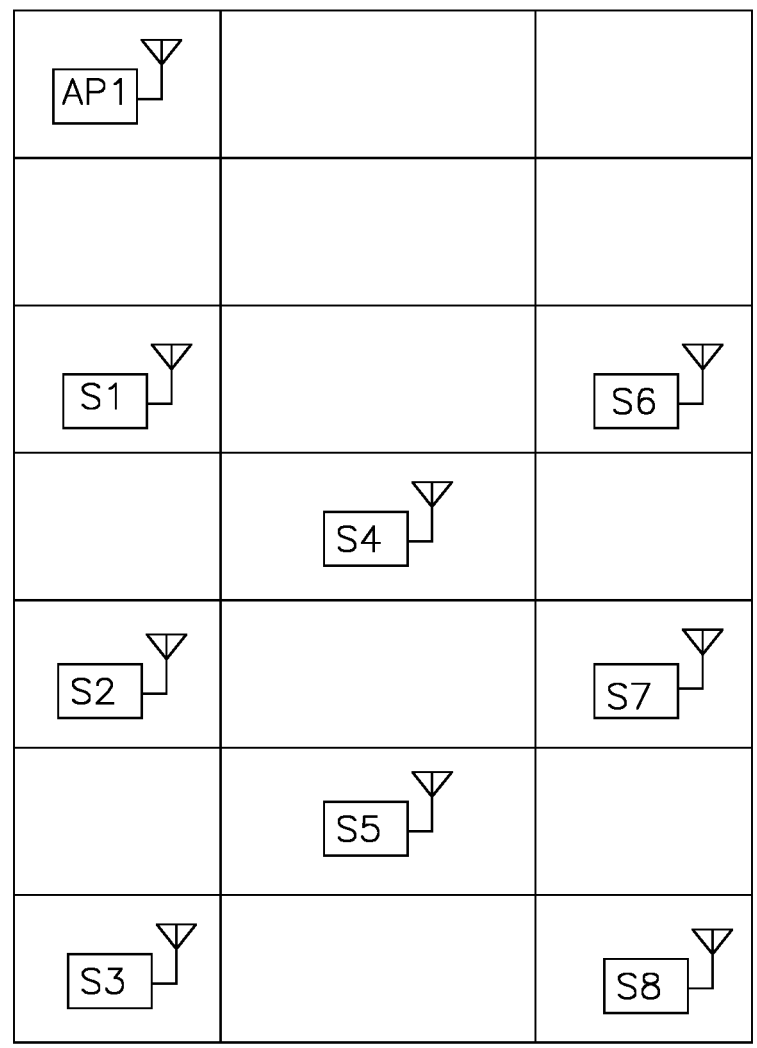
FIG. 1A shows the positions of a gateway station and a plurality of stations in either a plan view without barriers, or alternatively an elevation view of stations in a building.
Figures 1B, 2A:
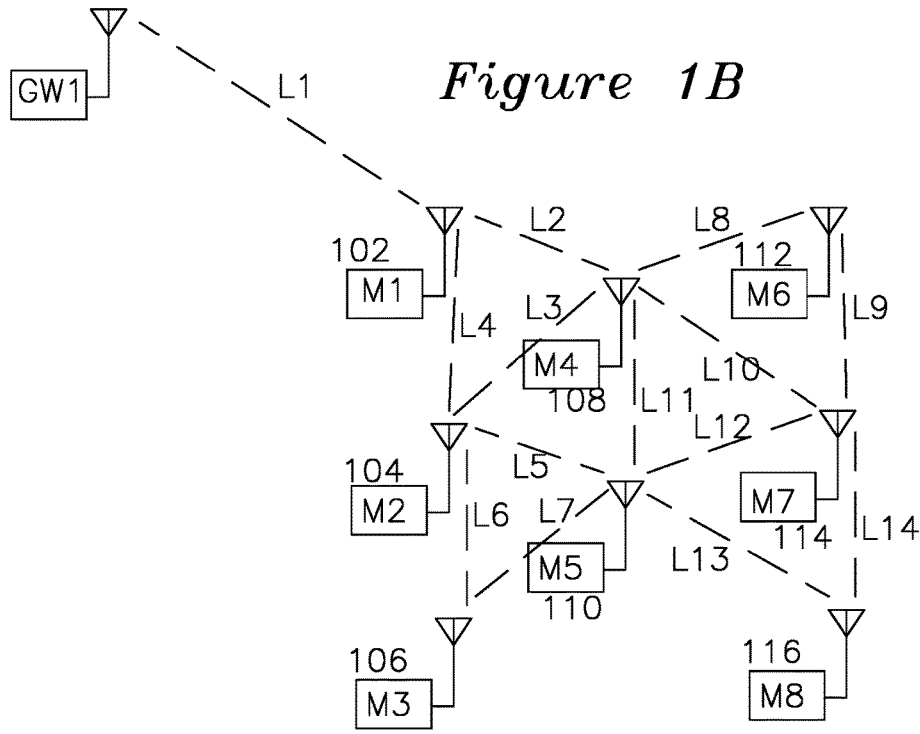
FIG. 1B shows block diagram of a plurality of stations in a mesh network.
FIGS. 2A and 2B show the list of stations maintained by each of the nodes in FIG. 1B.

FIG. 1B shows an example mesh network formed from mesh devices of the present invention. Each of the mesh stations M1 102, M2 104, M3 106, M4 108, M5 110, M6 112, M7 114, M8 116 is shown as 300 of FIG. 3, which includes wakeup receive processor 304 for waking up the mesh receive processor 308 from an RF sequence, and transmit processor 302, which is operative in a wakeup transmit mode for sending a wakeup sequence formed from keyed RF patterns (or alternatively from entire WLAN packets) as a sequence of "1" values for an entire packet or RF duration or "0" when not transmitting for an equal interval of time, sending this sequence to surrounding mesh stations as RF. In a mesh transmit mode, the transmit processor 302 may transmit ACK and data packets as IEEE 802.11ac, IEEE 802.11n, IEEE 802.11g, or any IEEE 802.11 frame format, or it may transmit ACK and data packets as Zigbee, or it may transmit ack and data packets as Bluetooth packets, either as BLE or BLR packets.

Figures 2B, 3:
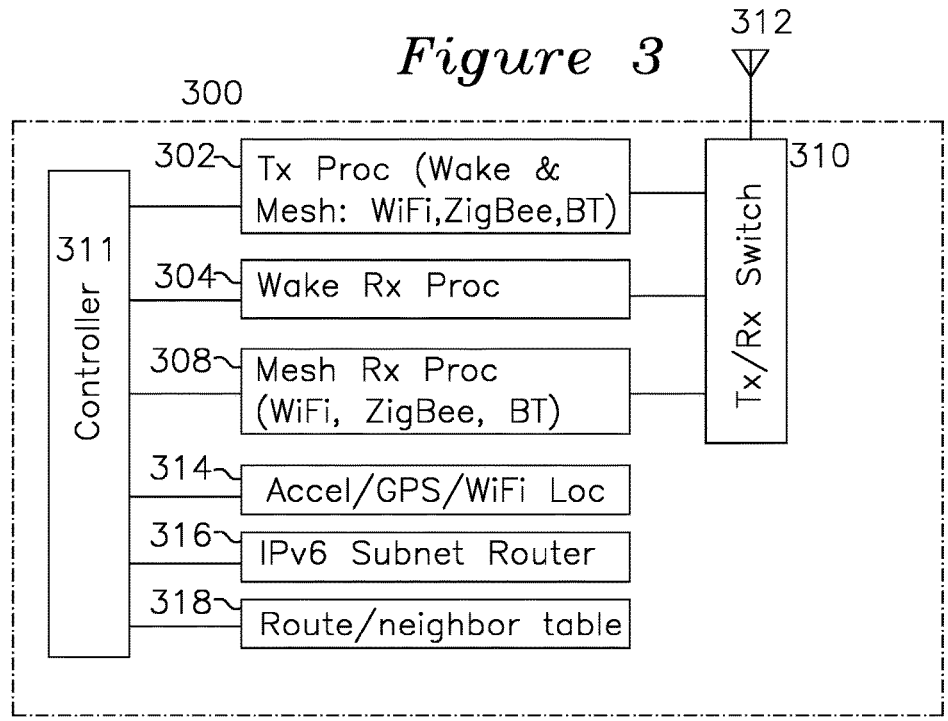
FIG. 3 shows a block diagram of a mesh node.

Each station maintains a list of adjacent stations as entries, each entry shown with the associated link for reference, the entry including a remote station identifier, a signal strength for that remote station, a State of Charge (SOC) indicating the remaining battery life, and a gateway path number (GPn) showing how many hops to a remote gateway. From these entries, a metric may be formed which indicates a best routing path which also ensures that all of the mesh station batteries are uniformly depleted over the life of the mesh stations. FIGS. 2A and 2B show an example list of entries for each station M1, M2, M3, M4, M5, M6, M7, and M8. Upon receipt of a wakeup frame from an adjacent mesh station, the receiving station wakes up, optionally sets itself to a particular wireless protocol (802.11, Zigbee, Bluetooth) on a specified frequency channel or temporal channel, sends an ACK packet to the wakeup transmitting station using the selected protocol and channel which optionally accompanied the wakeup sequence, enables its mesh receiver for the selected protocol and channel, receives the transmitted frames from the sending mesh station, places them into a queue, and either goes back to sleep, or sends the wake-up sequence directed to the intended next mesh station according to routing instructions it derives from its own set of route tables and any address information in the packets it receives.

FIG. 4 shows a timing diagram for a mesh transmit protocol according to an example of the invention. Each mesh device M1 through M8 operates autonomously from any other mesh device. As previously described for FIG. 3, each mesh device has a wakeup transmitter for sending a wakeup pattern to surrounding mesh devices, the wakeup message comprising a wakeup sequence of 1 s and 0 s formed by a packet and a packet gap, respectively, or keyed RF, either one of which is optionally followed by a command for establishing protocol, channel, and any other parameters for the communications which follow using the mesh transmitter and mesh receiver, starting with the mesh transmitter sending an ACK to the transmitting station in response to its wakeup sequence.

At a time when a mesh device has data to transmit to another station, the mesh device wakeup transmitter sends a wakeup sequence, using an entire packet of length n to form a "1" value and not transmitting anything for an equal duration of time to form a "0" value. By sending a sequence of packets ("1" value) and gaps ("0" value), the wakeup sequence may be sent, which may optionally be only a wakeup sequence universal to all mesh stations (for example so that each station can establish or refresh its table of neighbor stations), or the wakeup sequence may contain a first segment and second segment of different data rates, or a command may optionally follow the wakeup sequence that establishes the protocol and channels in use thereafter, as before.

In a hierarchical wakeup sequence, the wakeup sequence may comprise two or more wakeup sequences having different bit interval timings, for example the wakeup sequence may comprise a low rate first wakeup sequence followed by a higher rate wakeup sequence, each formed from a sequence of packets and gaps as previously described, each 1 or 0 of a subsequent wakeup sequence having a 1 or 0 bit duration t of t/2, t/4, t/8, or t/16 compared to the 1 or 0 of a previous sequence. For example, the wakeup sequence could be 2 ms overall, as 8 bits in 1 ms followed by 64 bits in 1 ms. In another example of the hierarchical wakeup sequence, the first wakeup sequence may be a universal sequence of 1 s and 0 s for the first wakeup segment followed by a higher rate second wakeup sequence where the second wakeup sequence includes an address specific to a particular destination mesh station. The advantage of the hierarchical wakeup sequence is that a receiving mesh device may sample at a comparatively low rate until it senses that a mesh station wishes to transmit, thereafter examining the second wakeup segment at a higher sampling rate to determine whether its address is specified in the second wakeup sequence and that it should awaken. The hierarchical approach for wakeup sequences has power savings advantages over operating at a high sample rate at all times. The wakeup sequences may be transmitted by a mesh station at regular intervals, such as once per second or once per 0.1 second, or adjusted dynamically to match the rate of traffic or utilization.

FIG. 11A shows an example hierarchical wakeup sequence where, following channel noise 1107, a first wakeup sequence is received which is 1 ms long, comprised of 8 bits transmitted at a rate 125 us per bit and with an first sequence false alarm rate (FAR) of 10% over the 8 bit sequence, meaning that the incoming pattern is cross-correlated to form a cross-correlation sum which is compared to a threshold corr_threshold. In this example, the first 8 bit wakeup sequence 1108 may be cross-correlated with a universal 8 bit wakeup pattern, the cross correlation generating a +1 for each bit match and a 0 for each mismatch, with the result at the end of the cross-correlation compared to the corr_threshold to generate a trigger which tells the wakeup processor to continue sampling the second 1 ms, but using an 8× higher sample rate (and accordingly higher power consumption). The initial sample rate set to 125 us has advantageously low current draw, whereas the higher sample rate and higher current draw is only incurred when the first sequence cross-correlation threshold is exceeded, with the threshold set to an example 10% FAR (rate of false detection of first wakeup sequence). The threshold corr_threshold may be varied according to desired system performance to higher or lower false alarm rates. If the first wakeup sequence does not match the pattern stored by the device, the device continues to sample at the 1 ms rate until it does find a match. The current consumption during the time searching for the matching 8 bit sequence has an advantageously low current consumption of just 1 uA, and the first 8 bit sequence 1108 may be a common pattern recognized by all devices. The second sequence 1110 is also 1 ms in duration, transmitted as 64 bits at 15.6 us per bit, resulting in 8× the power consumption during the second wakeup sequence at 8 uA. If the second wakeup sequence does not match the wakeup pattern (which may include the device-specific address or multi-cast address), the device returns to the lower sample rate of the first wakeup sequence search. Accordingly, the 64 bits of the second sequence have a low false alarm rate of $10^{-8}$, ensuring that when only 20% of the wakeup sequence (first and second sequences) are directed to a particular station, the current consumption for that station is 1 uA 80% of the time and 8 uA for 20% of the time, resulting in an average current of 2.6 uA. This is a significant improvement over the case where a single wakeup pattern of 64 bits is used, resulting in a current draw of 8 uA for the wakeup sequence. In one example hierarchical embodiment, the first wakeup sequence is 8 bits in 1 ms, and does not include a pseudo-random sequence as described in U.S. Pat. No. 9,477,292, which is incorporated in its entirety by reference. In the example embodiment, the second wakeup sequence is 64 bits in length and at least part of the second wakeup sequence is time encrypted such that a sequence of possible next pseudo-random sequences are autocorrelated for wakeup. Additionally, the second wakeup sequence may include a unicast address for a single device, a broadcast address for several devices, and the second wakeup sequence may be followed by additional commands including a channel assignment or protocol assignment.

As the incoming wakeup pattern bit rate is very low, the wakeup RF receiver may be powered on and off at a rate of the bit rate of the bit sequence being sampled. For the present example of 8 bits in 1 ms followed by 64 bits in 1 ms, the receiver may repetitively power on and off at a rate of 8 Khz during the first interval and 64 Khz during the second interval, each sample used in forming a running cross-correlation result with the wakeup-pattern, as described in U.S. Pat. No. 9,477,292.

On the wake-up pattern transmission as it relates to prior art Access Points (AP) and other equipment which predates the present invention, a particular advantage of the wakeup-transmitter mode 302 is that any existing prior art WiFi device which is able to be firmware upgraded can form wake-up packets according to the present invention, since WLAN packets with arbitrary data contents can be formed into a wakeup sequence easily, with the packet length selected to form the "1" pattern and non-transmission forming the "0" pattern of the first and second wakeup sequence, and both the mesh device and the prior art WiFi device are already fully capable of communication once the mesh device is awake using prior art WLAN methods and standards. In this manner, the prior art WLAN device can easily be firmware upgraded to transmit the wakeup sequence as a series of packets and packet gaps.

The waveform 402 of FIG. 4 shows an example wakeup sequence, where the wakeup sequence is transmitted at regular intervals for mesh node advertisements, such as from 404 to 406, from 408 to 410, and from 412 to 414, or on a demand basis when a node has data to transmit through the mesh. Alternatively, the wakeup transmissions may occur at an infrequent rate, and thereafter on a demand basis when data has been received which is to be forwarded to a subsequent mesh station.

An expanded view of a wakeup sequence 404 to 406 is shown in FIG. 4A waveform 420, where each "1" value 422 and 426, for example, is formed by an entire WLAN packet (from preamble through CRC), and each "0" value 424 is formed by having the transmitter remain silent for an equal duration of time as the "1" value packet duration of time, with the "1" values and "0" values each having a uniform time length in each sequence, as was previously described. Waveform 420 shows a single wakeup sequence 434, where the wakeup sequence is a unique address for a receiving station (for a unicast transmission) or is a common address shared by all stations (for a broadcast message).

FIG. 4B waveform 440 shows a hierarchical wake-up sequence embodiment, where the wakeup sequence 443 comprises a first wakeup sequence 442 followed by a higher rate second wakeup sequence 456. Optional commands 458 may follow for protocol and channel selection, as previously described.

FIG. 4C shows another variation, where the wakeup sequence 469 may be identical for all mesh stations and followed optionally by a device address (unicast or broadcast) 478, and also optionally include commands 480.

Figure 5A:
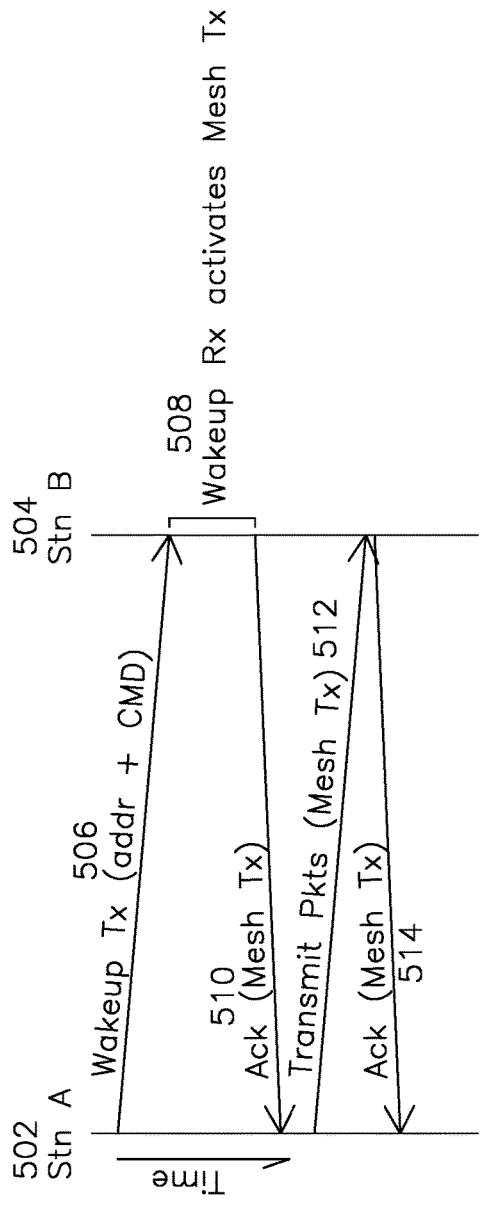
FIG. 5A shows a time sequence diagram for a first mesh station transmitting to a second mesh station.

FIG. 5A shows a timing diagram for mesh stations A 502 sending data to mesh station B 504 using a WLAN protocol and predefined channel assignments. Station A 502 starts by sending a wakeup sequence (1 s and 0 s as WLAN packet/ silence from transmitter 302 of FIG. 3) to surrounding stations. Station B has an address which corresponds to the particular wakeup sequence transmitted by station A 502, and responds by waking up during interval 508, activates its mesh transmitter for WLAN packets, and transmits an acknowledgment 510 to station A, which has also awoken to receive the acknowledgement as a WLAN packet. The mesh station 502 transmits packets 512, which are acknowledged 514 by station B 504, and station A goes back to sleep in a low-power mode, responding only to wakeup packets it may receive from surrounding stations where the wakeup packet is formed to include the address of STN A.

Figure 5B:
FIG. 5B shows a time sequence for data passing through the mesh network of FIG. 1B.

FIG. 5B shows a timing diagram for mesh communications, where the sequence of FIG. 5A repeats for each event for station M8 520 transmitting packets to GW1 528 through the mesh. The sequence of wakeup sequence 530, WLAN ACK 532, WLAN data 534, and WLAN ACK 536 complete the transmission from mesh station M8 to M5 522. M5 522, before or after sending ACK 536 to M8, sends a wakeup packet 538 to M2, which initiates the same WLAN ACK sequence of 540, TX DATA 542, and WLAN ACK 544 in transferring from M5 to M2. The transfer from M2 to M1 similarly occurs starting with wakeup sequence 546, and mesh transmit 550 sends high speed data from M2 to M1 using any of the protocols as described. Data from mesh station M1 526 to gateway 528 is accomplished in the final step where the gateway 528 may be awaken with packet 554, which is acknowledged as a WLAN packet 556, and the data is transmitted 558 and acknowledged 560.

FIG. 6A to 6G shows a time sequence corresponding to the movement of data from M8 to M5 and from M5 to M2 of FIG. 5B. Waveform 602 shows the wakeup sequence sent to M5 from 620 to 622 and received by M5 as waveform 604 showing the receive event from 624 to 626 of the 1 and 0 wakeup sequence, which is acked from time 628 to 630, followed by data transmission from 632 to 634, which the remote station acks from 646 to 648, which initiates station M5 waking M2 from 640-642, ending the canonical cycle of wakeup, ack, data transmission, ack, and next station wakeup shown by the transactions of 601 (vertical axis).

Figure 10A:
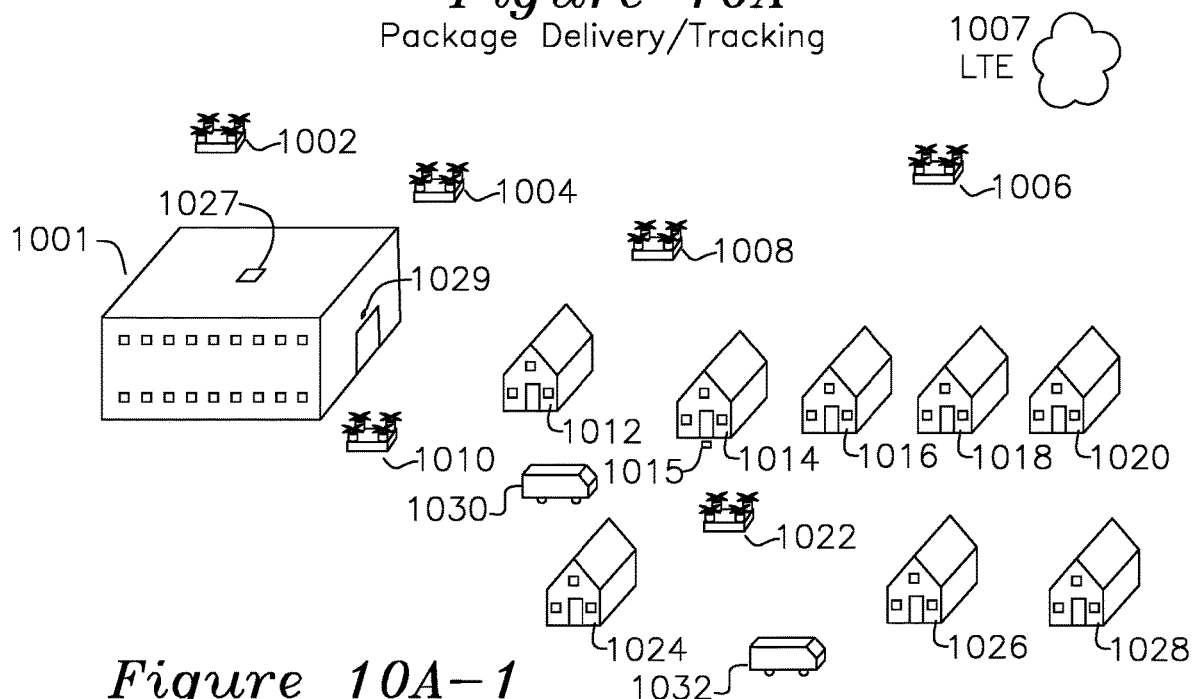
FIG. 10A shows a perspective view of an arrangement of mesh nodes for package delivery and tracking.
Figures 1, 10A:
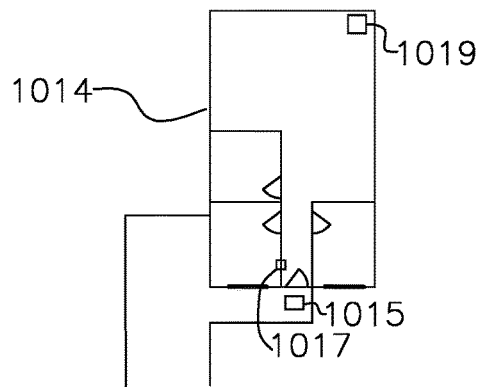

In one example, the mesh network may be configured for operation as a local mesh (such as the package delivery example of FIG. 10A where the mesh station of the package is coupled over a short distance to a nearby warehouse access point 1027, drone mesh station, delivery truck mesh station or residence mesh station. In another example, the mesh network may be configured for longer long range connections, such as when used as a neighborhood mesh of FIG. 10B or smart city of 10C.

For a local mesh, the wakeup receiver requires receive sensitivities similar to those used in WLAN IEEE Standard 802.11n, 802.11ac, ZigBee or Bluetooth, with receiver sensitivity for an approximate 100-110 dB link budget, which implies approximately 10-20 dBm transmit power and approximately −85 to −95 dBm receiver sensitivity. The distance between stations in each hop of a local mesh is typically 30 m-200 m depending on path obstacles. In a neighborhood mesh with longer link distances, greater sensitivities similar to WLAN IEEE 802.11ah or Bluetooth Long Range protocol are used of approximately 125-140 dB link budget, translating into a transmit power of 10-25 dBm and −105 to −120 dBm receiver sensitivity. Using these metrics, each hop in neighborhood mesh can reach 200 m to 2 km typically, depending on the multi-path reflection and path obstacles.

Additionally, for a neighborhood mesh, the receiver sensitivity requirement is greater than the local mesh configuration. The increased receiver sensitivity for the neighborhood mesh is achieved by using a receiver with lower noise figure, greater antenna gain, and narrower receiver bandwidth of approximately 100 KHz to 400 KHz whereas the wakeup receiver operating on a local mesh configuration can have relaxed receive bandwidth of approximately 2 MHz to 10 MHz. For mesh communications, the receive bandwidth is typically achieved by mixing the received RF to an intermediate frequency (IF) and filtering that frequency, then baseband converting the IF. In the case of the wakeup receiver, it is sufficient for the wakeup receiver to convert the incoming RF to an IF that is approximately 2 Mhz to 10 Mhz offset from the carrier frequency for local mesh communications, or 500 Hkz for neighborhood mesh communications, where the carrier is typically 2.4 Ghz or 5 Ghz for 802.11. In either method, the output of the IF mixer is filtered to the bandwidths described and envelope detected such as with a diode or baseband mixer and filter.

Figure 12:
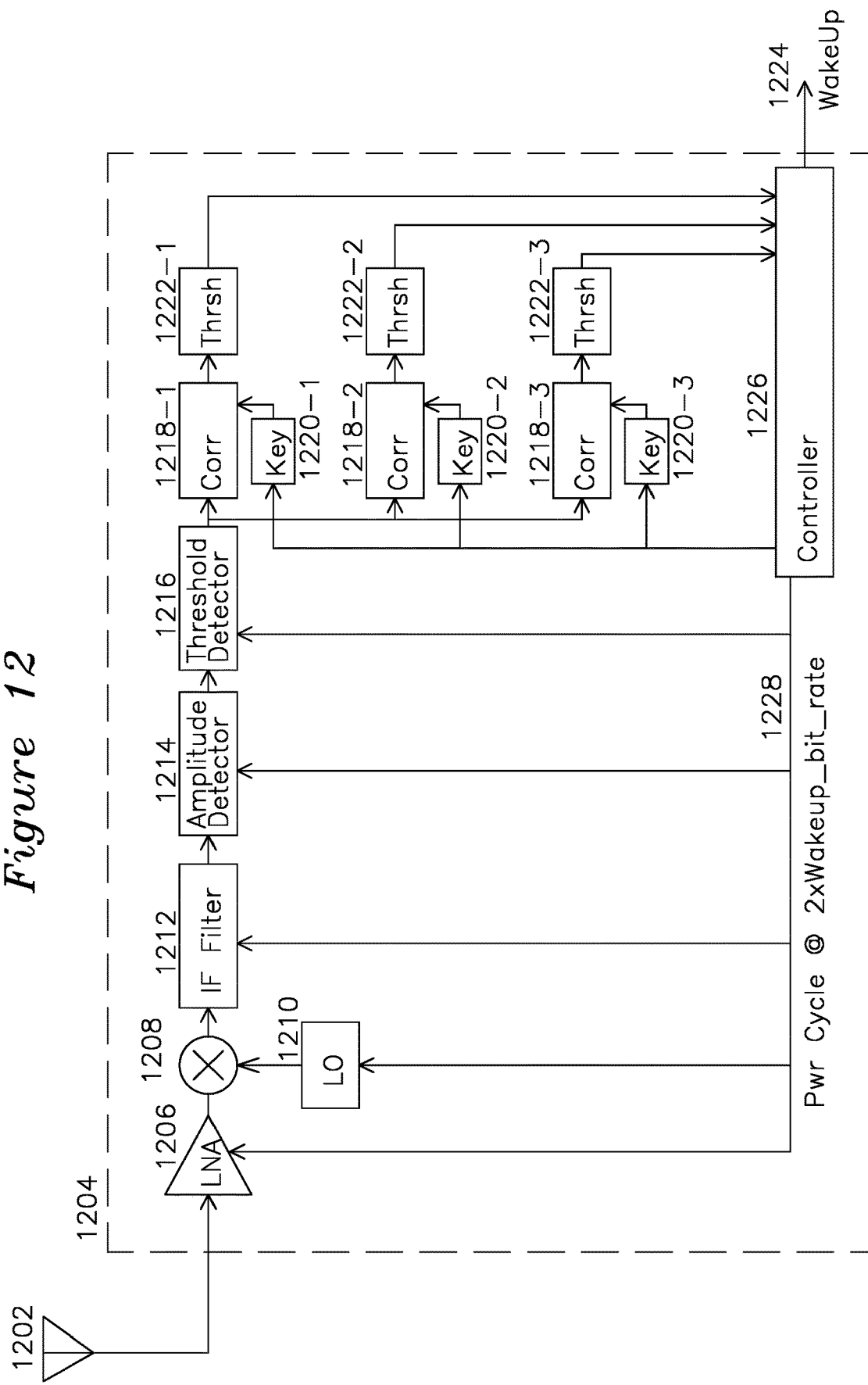
FIG. 12 shows an example block diagram for a wake-up receiver according to an embodiment of the present invention.

FIG. 12 shows an example block diagram for a wakeup receiver 1204 according to the present invention. Wireless wakeup sequences are received on antenna 1202 according to keyed on/off patterns of RF power, which are received and amplified 1206 and applied to mixer 1208, which mixes with a local oscillator which is offset by a frequency such as approximately 100 Khz-400 Khz for a neighborhood (long range) receiver, or 2 Mhz-10 Mhz for a local (short range) receiver, and is filtered 1212, envelope detected 1214, threshold detected to produce and store a binary pattern, which is correlated and accumulated 1218-1. The correlator will produce a peak accumulated value at the point where the incoming wakeup sequence from threshold detector 1216 matches the wakeup pattern stored in key 1220-1, with an example 8 Khz sample rate, which will trigger threshold detector 1222-1, signaling to the controller to start sampling at the rate of the second wakeup sequence (64 Khz for 64 bits in 1 ms), in one example of the invention, the first and second successful correlations resulting in the assertion of wakeup output 1224. As an additional power savings, the processing circuitry 1206, 1208, 1210, 1212, 1214, 1216 are powered up only long enough to take a sample to provide to the correlator 1218-1, each component powered up a settling time prior to the sample time. It should also be noted that because the IF filter frequency 1212 has a longer response time for neighborhood mesh applications than local mesh applications, the IF filter is programmed by the controller 1226 accordingly, and the power-on duty cycle 1228 is slightly increased to compensate for the longer settling time required in neighborhood mesh wakeup configuration than local mesh wakeup configurations. In one example of the invention, the sample rate (and power-up rate of the processing elements of FIG. 12) is the same as the bit rate. In another example of the invention, the samples are taken as "even" samples at 1× the wakeup pattern bit rate and as "odd" samples at 1× the wakeup pattern bit rate, shifted 180 degrees to the midpoint of the "even" samples. In this manner, the problem of sampling transitions is avoided.

For a wakeup pattern which is secured by a random sequence derived from a time for secure wake-up sequences, multiple correlators and keys are used 1218-1/1220-1, 1218-2/1220-2, 1218-3/1220-3, one for each possible key to cover the case of temporal boundary key changes. FIG. 12A shows an example of key generation 1250 where each matching key is securely generated at both the transmitting station and each receiving mesh station. A root of trust 1252 secures that the shared public key 1254 is authentic, and public key 1254, private key 1256 which is securely given to all stations during a commissioning event. The commissioning event may be the assignment of a hard-coded secret key burned into the device at time of manufacturing of all mesh station devices, or by using an assigned secret key at a configuration event. The public and private key, as well as a time clock 1258 are input to a one-way function 1260 which generates an output code from which it is difficult to extract the algorithm which produced it. The one-way function may be a hash, or it may be any function for which it is difficult to find an inverse function, thereby preventing the extraction of the private key or function for use in spoofing the network from knowledge gained by examination of the behavior of the one-way function 1260 or its output sequences. The output of function 1260 is used to update at least one of first key 1220-1, second key 1220-2, or third key 1220-3 used by the receive wake-up correlator. Typically, a transmitter will use a first time-varying key for unicast transmission, and a second time-varying key for multi-cast transmission, or a single key may be used with the unicast/multicast distinction provided by a follow-on field, as was described previously. The receiver keys 1220-1, 1220-2, and 1220-3 are the wakeup sequence patterns used by the autocorrelator as described for FIG. 12 and also used as the wakeup sequence sent by the wake-up transmitter. When the secure key changes because of a time increment, the transmitter protocol completes the current secure key transmission before changing to a different secure transmit key, so the incoming sequence of correlation is allowed to complete before the controller 1226 provides a new secure key, and it only need change one secure key at a time at each secure key update event.

Using the hierarchical first wakeup pattern and the second wakeup pattern, it is possible to get longer bit times without sacrificing false alarm rate. The first wakeup sequence primarily determines bit duration and hence the wakeup receiver sampling rate, and the second wakeup sequence of the hierarchy primarily determines the false alarm rate. For this reason, in neighborhood meshes with potentially longer links and lower SNR, the use of the hierarchical first and second wakeup sequence is more important to minimize the average power of the wakeup receiver to less than 10 uA while retaining the mesh hop latency to <2 ms in the case where the wakeup pattern length is approximately 2 ms in total length of first sequence and second sequence.

It was previously noted that for the prior art operating at the 10 uA level, Bluetooth was capable of 5.4 MB/day and WiFi was capable of 18 MB/day. However, using the prior art Bluetooth connection at 1 ms/500 ms would result in a latency of 2 seconds per hop, and Wifi at ⅙₀₀₀ ms would result in latency of 24 seconds per hop, whereas the latency of the present invention for a first and second wakeup sequence of 1 ms each results in a latency of well less than 3 ms per hop, providing a latency improvement of ~100× for Bluetooth and ~1000× for WiFi.

Figure 7:
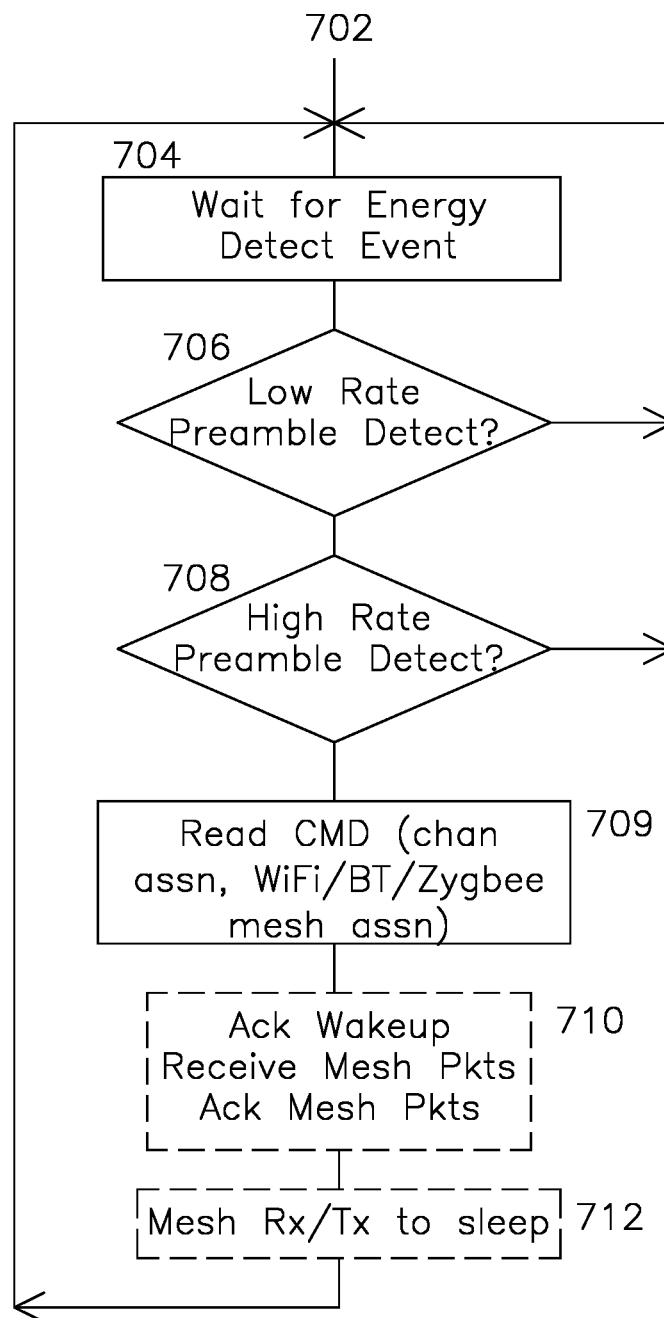
FIG. 7 shows a flowchart for a wakeup receiver process.

FIG. 7 shows a process flow for a wakeup receiver using the hierarchical wakeup sequence. The wakeup receiver 304 of FIG. 3 may detect RF energy 704 by rectification of incoming RF energy against a threshold for ultra-low power consumption (the rectifier is passive and the threshold detector requires minimal power), by mixing incoming RF to baseband with amplification and detection to detect the envelope of the RF, which is more sensitive while consuming a miniscule amount of current which is only slightly greater than rectification. When RF packet energy is detected by one of these methods in step 704, a low rate preamble detection process occurs 706 for the duration corresponding to 440 of FIG. 4, optionally followed by a high rate preamble detection process 708 (for hierarchical wakeup processing) corresponding to 456 of FIG. 4. When the wakeup sequence corresponds to the unicast wakeup sequence of a particular mesh receiver, the corresponding mesh receiver wakes up 710, enables the mesh station transmitter 302 of FIG. 3 to acknowledge the wakeup (using a mesh WLAN packet), receives mesh packets from the adjacent station, and sends an acknowledgement, thereafter either returning to sleep 712 and waiting for the next wakeup packet 704, or sending its own wakeup packet to the next hop station, each station repeating the hop sequence until the destination station or gateway is reached. Steps 710 and 712 are shown in dashed lines for reference, as these functions are performed by the mesh transmitter and receiver, and not the wakeup receiver of FIG. 7. Additionally, station RSSI data and other information as described in the tables of FIGS. 2A and 2B are maintained for stations which have previously transmitted mesh data to the wakeup receiver, which may be periodically accomplished by having each station transmit a broadcast packet so that all adjacent stations may wake up and update their respective station tables as shown in FIGS. 2A and 2B.

The mesh station of FIG. 3 shows the transmit processor 302 as previously described, which is capable of transmitting keyed wakeup sequences by keying the RF transmitter on and off, or by using entire packets which may be used to form wakeup sequences, or alternatively, using packets for particular protocols including 802.11 family of wireless packets, Zigbee packets, or Bluetooth packets. Additionally, the transmit on/off 1/0 sequences may be formed by having the transmit processor send a long baseband packet to be mixed to a carrier frequency and transmitted, with the on/off keying performed by turning on and off any of: the RF amplifier, the mixer, or any other RF chain components which amplify or couple the RF to the antenna, thereby forming the desired 1/0 pattern of the wakeup sequence. The wake receiver process 304 compares an incoming wakeup sequence to a station-specific receiver address and a broadcast address, taking the device out of sleep mode when a match is made. Optionally, the wake-up processor 304 also processes a command such as an instruction to enable the mesh station to operation with a particular protocol or channel. The mesh receiver 308 is able to receive and process the specified protocol type and frequency channel as specified in the optional command part of the wakeup sequence as was described in FIG. 4. For certain applications, it may be desirable for the mesh station 300 to determine a location via GPS, or determine a location using a WiFi protocol, or to detect movement using an accelerometer as provided by location and motion functions 314. An IPv6 subnet router 316 is provided for forming and operating on the subnet of mesh stations, and the route/neighbor table 318 is provided for local subnet routing based on providing SOC metrics so that the stations are equally taxed for power consumption over the life of the local battery. The route tables may also include entries indicating a route cost or available bandwidth so that uniform utilization of the mesh stations may occur by including route utilization information in the route tables so these are considered in the route metric.

Figure 8:
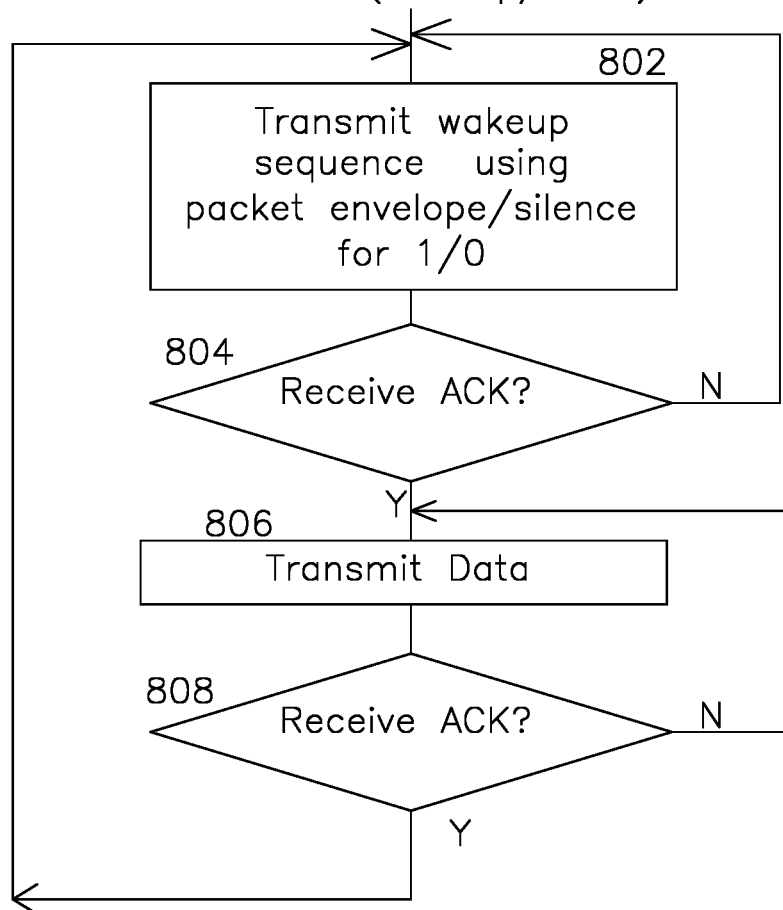
FIG. 8 shows a flowchart for a wakeup transmitter process.

FIG. 8 shows a process flow for the transmitter in a mesh data transmission mode, which starts with forming the wakeup pattern of 1 s and 0 s using entire WLAN packets or keyed RF in step 802 corresponding to the wakeup-pattern of a unicast target device. The transmitter may emit a "self-CTS" on the channel using a prior art method to prevent other stations from transmitting during the interval the transmitter is sending the wakeup sequence. After transmission of the self-CTS and wakeup pattern, if an ACK is not received, a retransmission step 802 is performed, or if the ACK is received, transmitting mesh data using the specified protocol 806, and finally either receiving an ACK and returning to step 802 when the next transmit wakeup even occurs, or retransmitting the previous data 806 if an ACK was not received.

FIG. 8 may be understood for periodic advertising by transmitting a broadcast sequence for which all mesh stations are responsive. In the advertising mode, broadcast wake-up sequences are periodically transmitted to surrounding mesh stations (such as with the hierarchical wakeup patterns of waveform 440), with the first and second sequence generation and transmission is called in step 802, which generates the first sequence 440 and optionally second sequence 442 for the hierarchical wakeup pattern. The advertisements are infrequently transmitted 802 for the purpose of allowing each device to update its station table 318 of FIG. 3, with the ACK 804 being optional, and no data being transmitted 806 or received 808.

Figure 9:
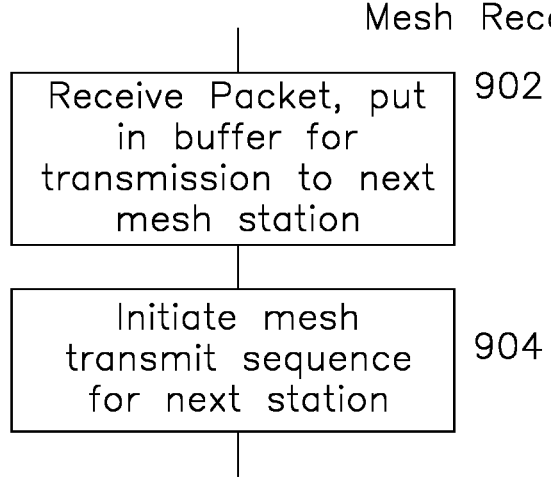
FIG. 9 shows a flowchart for a mesh receiver process.

FIG. 9 shows the process for a mesh receiver, which is only powered on receipt of a wake-up frame identifying the present mesh as destination, such as by use of a unique wakeup pattern for that station. The mesh receiver receives the packets, acks them (as shown in series 601 of FIGS. 6B-6E), and initiates the transmit sequence (wakeup, ack, transmit data, ack, sleep) in step 904.

In another aspect of the invention using hierarchical wakeup sequences, the first sequence or the second sequence uses a pattern which varies over time and is known to all of the devices in a local mesh. One type of security exploit the wake-up receiver is susceptible to is an exploit where a listening hostile device learns the first wakeup sequence and second wakeup sequence and launches a "battery attack" on the mesh devices by repetitively sending wakeup sequences and causing the mesh receivers to draw excess current in the wake-up state for non-existent packets. This may be addressed by providing a series of time-stamped wakeup pattern, such as by using a time-synchronized series of unique wake-up patterns known only to the mesh devices, for example where the public (shared) key is sent to all nodes in a broadcast command from an initial state. In one example of the invention, the first wake-up sequence is a pseudo-random sequence known to the mesh transmitters and mesh wake-up receivers. However, this may not be desirable since the objective of the first wakeup sequence is low power and is typically a short sequence. In another embodiment of the invention, the second wakeup sequence is longer and is used for the time-stamped wakeup pattern, as the receiver is subsequently enabled after the second wakeup sequence is a match for a particular mesh device.

FIG. 10A shows a perspective view of an example package tracking and delivery system using the present invention. In one example of the invention, a distribution warehouse 1001 has one or more warehouse access point nodes 1027 for communication with mesh nodes inside the warehouse, and with a transit point node 1029 detecting that packages which are outfitted with mesh devices have left the warehouse for distribution to customers. The packages may be delivered by drones (1002, 1004, 1006, 1008, 1010, and 1022, and trucks 1030 and 1032, each drone or truck having a local mesh node, a GPS or other location tracking system, and an LTE wireless communication system which transmits location and package status to a remote tracking server such as through the LTE wireless network 1007. The drone wireless stations 1002, 1004, 1006, 1008, 1010, 1022, are similarly outfitted with GPS or location tracking system, a mesh node for communication with the package or package mesh nodes they transport, and an LTE wireless system for communication with an LTE network 1007. A delivered package 1015 may be detected by a residential mesh or access point in residence 1014 for confirming delivery to the resident apart from the notification provided by the delivery drone or truck. Alternatively, the drone wireless stations 1002, 1006, 1008, 1010, 1022 and truck wireless stations 1030, and 1032 each may locally form a separate mesh with each other when in proximity, each station in communication with at least one adjacent station capable of providing updates through the LTE network 1007 or a mesh gateway or access point back to the distribution warehouse 1001 or other point of access, thereby communicating data about package deliveries and delivery status to the various delivery destination customers 1012, 1014, 1016, 1018, 1020, 1024, 1026, and 1028. In another alternative embodiment, the packages which are outfitted with mesh nodes transmit location information to each other, which is transmitted back to the warehouse 1001. As is clear from the number of moving mesh stations of FIG. 10A, it may be desirable for at least one mesh station to have an accelerometer, GPS receiver, or WiFi location information 314 for indicating when it is on the move, so that it can rebuild its database of neighbor mesh nodes, as well as periodically provide location updates to the central warehouse 1001 which provides updates to the various package recipients.

Figure 10B:
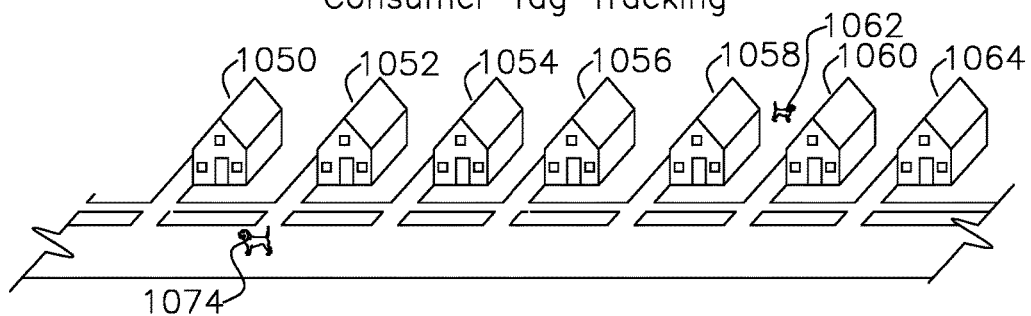
FIG. 10B shows a perspective view of a residential neighborhood with consumer tags for monitoring and tracking items.

FIG. 10B shows a neighborhood tag tracking example of the mesh network where a local mesh is formed by stations within a particular household, or alternatively, a mesh network is formed by mesh stations in houses 1050, 1052, 1054, 1056, 1058, 1062, and 1064. Pets 1074, and 1062 in the neighborhood may wander within established boundaries determined by the fixed station locations, such that when an animal moves beyond its established boundary (based on RSSI, GPS, signal strength to one or more locations, or presentation near an unexpected remote mesh station), an alarm may be sent to its owner, accompanied by the current location, or a continuously updated series of locations for providing a movement vector. In one example, a trigger for the sending of a location message occurs when the mesh network examining known stations and Received Signal Strength Indicator (RSSI) associated with the animal's normal range of movement detects proximity to a previously unknown mesh station after losing contact with a known mesh station. For example, mesh stations 1058 or 1060 may be known for pet 1062 in a backyard adjacent to mesh station 1058, whereas lost pet 1074 may be associated with backyard 1056, such that when station 1056 loses communication with pet 1074, or the receiving gateway receives information that pet 1074 is not in communication with 1056 but is in communication with 1050 and 1052, an alert indicating the location of the pet may be sent to the owner.

Figure 10C:
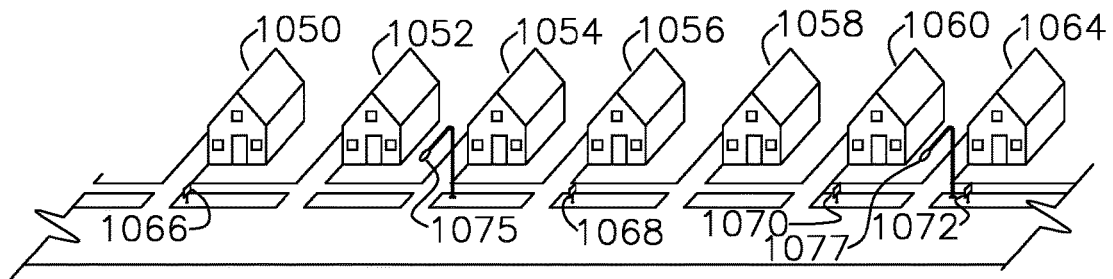
FIG. 10C shows a perspective view of a residential neighborhood with infrastructure tags for smart city monitoring of utilities and residential items.

FIG. 10C shows a "smart city" example, where the mesh nodes of each household 1050, 1052, 1056, 1058 1060, and 1064 are in local communication with aspects of associated city infrastructure, and city services provided through a mesh network which is part of signposts 1066 1068, and 1070, and light pole mesh stations 1075 and 1077. Other mobile or fixed mesh stations may be placed where needed for communicating with other mesh stations which may momentarily present themselves and exchange information.

Figure 10D:
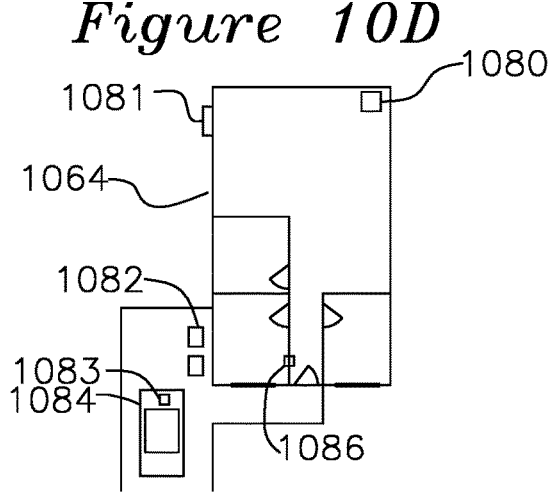
FIG. 10D shows a plan view of a residence in a smart city configuration of the invention.

FIG. 10D shows an example home 1064 from FIG. 10C, which may include a residential home security or home infrastructure information system. A central access point 1080 may be in communication with mesh stations 1081 for reporting electric utility measurement, garbage can mesh station 1082 for confirming refuse pickup, car 1084 mesh device 1083 for vehicle security, or front door mesh device 1086, which may detect delivered packages. Additional mesh nodes may be dedicated to security alarm systems, motion detectors, furnace and HVAC control systems, security camera systems, and other devices as may be used to provide more efficient use of energy and increased security.

Figure 10E:
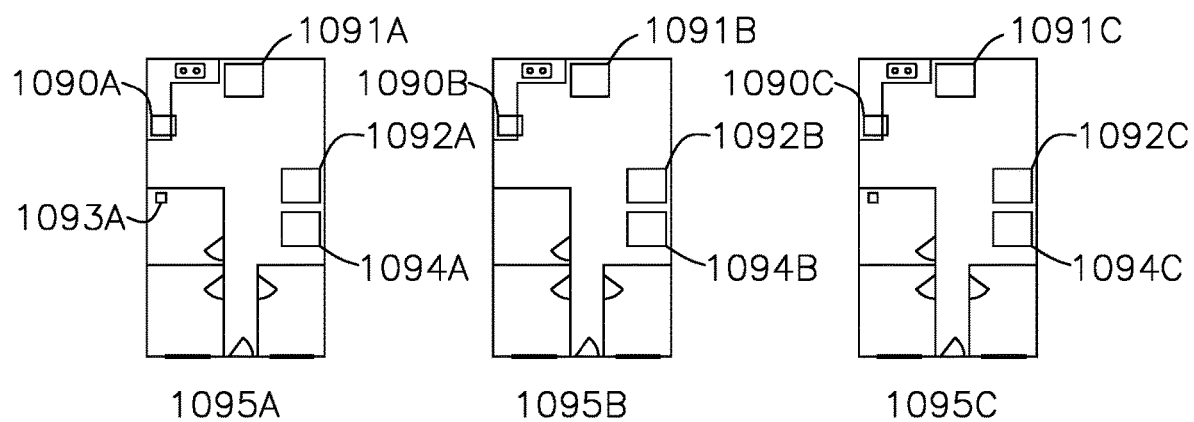
FIG. 10E shows a plan view of several residences in a mesh network.

FIG. 10E shows an example of a sparse mesh network, where only residence 1095 has a gateway 1093, but this and the other residences 1095A, 1095B, and 1095C each have meshed network-capable devices, such as refrigerator 1091A, 1091B, 1092C, washer 1092A, 1092B, 1092C, dryer 1094A, 1094B, 1094C, dishwasher 1090A, 1090B, 1090C, and other mesh devices which are enabled with Internet of Things (IoT) capable hardware. An ongoing issue in these "smart" appliances is that setup is required for them to be provisioned to a network, which is the prior art process of "joining" or "associating" to a wireless network, requiring configuring the IoT device, which often requires a computer and knowledge of the access point SSID, network key and network key type. Accordingly, few consumers with such "smart" appliances have the patience or time to connect them to a network, and service codes and the like which may otherwise be readable electronically require a service visit to read the repair code the device is attempting to provide. In the example of FIG. 10E, only one residence 1095A has a wireless gateway 1093A, and perhaps only refrigerator 1091A is configured to use the gateway, or perhaps no appliances are configured to use it, but gateway 1093 is mesh-enabled according to the present invention. In the mesh network of FIG. 10E, not only may the other appliances 1090A, 1092A, and 1094A connect to the internet using the mesh station of refrigerator 1091A to reach gateway 1093A, but the appliances in surrounding residences 1095B and 1095C may also join this mesh network to send their data through the mesh to device 1091A, or to access point router 1093A, and as long as a chain of two stations in receiving range of each other can be formed for each of the mesh nodes, a network path will be available for every appliance or mesh-ready device through the mesh devices to a gateway such as 1093A.

In the present specification, approximately is understood to mean to +/−12 dB for signal levels and +/−50% for distance or other linear measurement. The examples of the specification are set forth for understanding the invention, the scope of which is limited only by the claims which follow.

We claim:

1. A mesh receiver operative to receive a wakeup sequence comprising a first wakeup sequence of on-off keyed RF at a first wakeup data rate followed by a second wakeup sequence of on-off keyed RF at a second wakeup data rate greater than the first wakeup data rate, the mesh receiver having an RF amplifier, a mixer, and a baseband energy detector for detection of RF energy, the baseband energy detector indicating whether energy is present or absent to output a first sequence of 1s and 0s as sampled values at a first sample rate;

the mesh receiver having a first correlator for correlating the first sequence against a first template sequence of 1s and 0s matching a particular first wakeup sequence and asserting a first match output if a correlation is present;

the mesh receiver continuing to sample the baseband energy detector operative to output a second sequence at a higher sample rate than the first sample rate when the first match output is asserted;

the higher sample rate samples of the baseband energy detector applied to a second correlator for correlating the higher sample rate energy detector second sequence of samples against a second template sequence of 1s and 0s, the second template sequence matching a particular second wakeup sequence and asserting a wakeup output if a correlation of the higher sample rate baseband energy detector second sequence is present;

where the first template sequence, the second template sequence, the particular first wakeup sequence, and the particular second wakeup sequence are hash sequences derived from both a public key and a private key; and, where the first match output has a false alarm rate of 10% or more, and the second template sequence has a greater number of bits than the first template sequence.

2. The mesh receiver of claim 1 where each 1 value of said first sequence or said second sequence is formed from at least one of an entire packet conforming to an IEEE 802.11 standard for a bit interval, and each 0 value of said first sequence or said second sequence is the non-transmission of energy during a substantially equal said bit interval.

3. The mesh receiver of claim 1 where said first sequence is common to a plurality of mesh receivers receiving said first sequence.

4. The mesh receiver of claim 1 where said second pattern is unique to a particular receiver.

5. The mesh receiver of claim 1 where said second sequence includes a command.

6. The mesh receiver of claim 5 where said command includes at least one of: a protocol or a channel for use in receiving subsequent transmissions.

7. A method for a wakeup controller operative on a plurality of mesh receivers, each mesh receiver having an antenna coupled to an RF amplifier, the RF amplifier coupled to a baseband mixer, the baseband mixer coupled to an energy detector having an output indicating the presence of RF energy, the energy detector operative to generate a binary particular first wakeup sequence at a first wakeup sequence data rate and a binary particular second wakeup sequence at a second wakeup sequence data rate which is greater than the first wakeup sequence data rate;
the particular first wakeup sequence is one of a plurality of possible first wakeup sequences;
the particular second wakeup sequence is one of a plurality of possible second wakeup sequences;
a duration of the first wakeup sequence is substantially equal to a duration of the second wakeup sequence;
the method comprising:
performing a first pattern detection, where said wakeup controller samples the output of said energy detector at a first rate and applies the samples to a first correlator for detecting a match to a first pattern corresponding to the particular first wakeup sequence, the first pattern is the same pattern for a plurality of said plurality of receivers;
upon detection of the match to the first pattern, the wakeup controller continuing to sample the output of said energy detector at a second rate which is greater than said first rate, said second rate samples of the energy detector is applied to a second correlator for detecting a match to a second pattern, the second pattern unique to a particular one of said plurality of receivers and also matching the particular second wakeup sequence;
wherein the second pattern has a greater number of bits than the first pattern; and
upon said match to said second pattern, said wakeup controller asserting a wakeup output for energizing a receiver for reception of wireless packets.

8. The method of claim 7 where said first pattern is derived from a timestamp.

9. The method of claim 7 where said second pattern is derived from a timestamp.

10. The method of claim 7 where said second pattern includes a command.

11. The method of claim 10 where said command includes at least one of a channel identifier or a protocol type for use in receiving subsequent transmissions.

12. The method of claim 7 where said second sample rate is a power of two greater than said first sample rate.

13. A transmitter for a mesh station, the transmitter operative to transmit a first sequence of 1s and 0s to form a first wakeup pattern at a first bit rate and operative to transmit a second sequence of 1s and 0s to form a second wakeup pattern at a second bit rate which is greater than said first bit rate, a time duration of the first wakeup pattern is approximately equal to a time duration of the second wakeup pattern;
wherein said first wakeup pattern is followed by said second wakeup pattern;
each 1 bit of said first sequence having a first bit duration and formed by a transmission event of said first bit duration, each 1 bit of said second sequence having a second bit duration and formed by a transmission event of said second bit duration;
each 0 bit of said first sequence having the first bit duration and formed by non-transmission for an interval equal to said first bit duration, each said 0 of said second sequence formed by non-transmission for an interval equal to said second bit duration;
the first wakeup sequence and the second wakeup sequence are derived from both a public key and a private key, the public key and the private key are known to a station receiving the first wakeup sequence and the second wakeup sequence by a commissioning event; and,
the transmitter is operative after transmission of the second sequence and receipt of an acknowledgement to transmit a packet compliant with least one protocol of: 802.11 WLAN, Bluetooth Low Energy, Bluetooth Long Range, or Zigbee.

14. The transmitter of claim 13 where said first sequence or said second sequence is encoded with a time value.

15. The transmitter of claim 13 where said first sequence is common to all intended receivers of said first sequence.

16. The transmitter of claim 13 where said second sequence includes an address of an intended receiver.

17. The transmitter of claim 13 where said second sequence includes a command indicating at least one of a channel or a protocol used in a subsequent transmission.

18. A method operative on a controller coupled to an RF transmitter sending a first sequence of 1s and 0s at a first bit rate followed by a second sequence of 1s and 0s at a second bit rate greater than said first bit rate, the first sequence having a time duration approximately equal to a time duration of the second sequence, the second sequence having eight times the number of bits as the first sequence, the method comprising:
transmitting each said 1 of said first sequence as an entire WLAN packet or keyed transmission of RF for a first bit interval equal to a bit duration of said first bit rate, and transmitting each said 0 of said first sequence by disabling the RF transmitter for the first bit interval;
transmitting each said 1 of said second sequence as an entire WLAN packet or keyed transmission of RF for a second bit interval equal to a bit duration of said second bit rate, and transmitting each said 0 of said second sequence by disabling the RF transmitter for the second bit interval;
wherein the first bit rate and the first sequence are selected to have a false detection rate by a receiver in excess of 10%, the first sequence is common to a plurality of receiving stations;
the first sequence and the second sequence are derived from both a public key and a private key, the public key and the private key are known to a station receiving the first sequence and the second sequence by a commissioning event;
the second sequence is unique to a single receiving station; and,
the transmitter, upon receipt of an acknowledgement packet, transmitting packets according to at least one of the protocols: 802.11 WLAN, Bluetooth Low Energy, Bluetooth Long Range, or Zigbee.

19. The method of claim 18 where the number of said 1s is approximately equal to the number of 0s in at least one of said first sequence or said second sequence.

20. The method of claim 18 where the controller is operative to cause said RF transmitter to send a self-CTS prior to sending said first sequence.

* * * * *